United States Patent [19]

Siebers

[11] Patent Number: 5,250,474
[45] Date of Patent: Oct. 5, 1993

[54] GLASS POWDER WHICH IS CRYSTALLIZABLE TO YIELD A SINTERED GLASS CERAMIC CONTAINING HEXAGONAL CORDIERITE AS THE PRINCIPAL CRYSTALLINE PHASE

[75] Inventor: Friedrich Siebers, Mainz, Fed. Rep. of Germany

[73] Assignee: Schott Glaswerke, Mainz, Fed. Rep. of Germany

[21] Appl. No.: 15,086

[22] Filed: Feb. 9, 1993

Related U.S. Application Data

[63] Continuation of Ser. No. 832,832, Feb. 7, 1991, abandoned.

[30] Foreign Application Priority Data

Feb. 8, 1991 [DE] Fed. Rep. of Germany ....... 4103778

[51] Int. Cl.$^5$ .................... C03C 10/08; C03C 3/112
[52] U.S. Cl. ........................... 501/9; 501/57; 501/59; 501/69
[58] Field of Search ............. 501/9, 57, 59, 69

[56] References Cited

U.S. PATENT DOCUMENTS

| | | | |
|---|---|---|---|
| 3,926,648 | 12/1975 | Miller | 501/9 |
| 3,940,255 | 2/1976 | Harrington et al. | 501/69 X |
| 4,540,671 | 9/1985 | Kondo et al. | 501/9 |
| 4,764,486 | 8/1988 | Ishihara et al. | 501/9 |
| 4,997,795 | 3/1991 | Hang et al. | 501/9 |
| 5,099,174 | 3/1992 | Coxon et al. | 501/69 X |

FOREIGN PATENT DOCUMENTS

| | | |
|---|---|---|
| 0225279 | 6/1987 | European Pat. Off. |
| 0289903 | 11/1988 | European Pat. Off. |
| 2815312 | 12/1978 | Fed. Rep. of Germany |
| 3701973 | 1/1987 | Fed. Rep. of Germany |
| 957191 | 5/1964 | United Kingdom |
| 1307303 | 2/1973 | United Kingdom |
| 1365435 | 9/1974 | United Kingdom |
| 1556650 | 11/1979 | United Kingdom |

OTHER PUBLICATIONS

*Chemical Abstracts,* vol. 114, No. 18, May 6, 1991, Abstract No. 169810x.
Heidenreich et al., "Der Eiufluss von Fluor auf Phasentrennung, Kristallisation und Eigenschaften von Gläsern im MgO-Al$_2$O$_3$-SiO$_2$-System", *Silikattechnik,* vol. 27, No. 12, Dec. 1976, pp. 402–405.

*Primary Examiner*—Karl Group
*Attorney, Agent, or Firm*—Millen, White, Zelano & Branigan

[57] ABSTRACT

A glass powder crystallizable to yield a sintered glass ceramic containing hexagonal cordierite as the principal crystal phase is of the composition, in mol % on an oxide basis, of 48–61 SiO$_2$; 10–16 Al$_2$O$_3$; 23–35 MgO; 0–4 B$_2$O$_3$; 0–2.5 P$_2$O$_5$; 0.5–5 Σ B$_2$O$_3$+P$_2$O$_5$; 0–3 ZnO; 0–3 CaO; 0–1.5 BaO and as an essential component 0.5–12 F as a substitute for O. The glass powder may also contain a total of up to 3 mol % of one or more of the oxides PbO, SrO and SnO$_2$. The glass powder can be crystallized at sintering temperatures below 970° C. in a relatively broad sintering temperature range to yield a sintered glass ceramic having excellent and constant properties. It is particularly suitable for the production of electrotechnical and electronic components since it has very good electrical, dielectrical and mechanical properties. The sintering conditions can be varied within relatively broad limits without any adverse effect on the product obtained.

13 Claims, No Drawings

GLASS POWDER WHICH IS CRYSTALLIZABLE TO YIELD A SINTERED GLASS CERAMIC CONTAINING HEXAGONAL CORDIERITE AS THE PRINCIPAL CRYSTALLINE PHASE

This application is a continuation of application Ser. No. 07/832,832, filed Feb. 7, 1992, now abandoned.

BACKGROUND OF THE INVENTION

This invention relates to a glass powder which can be crystallized to yield a sintered glass ceramic containing hexagonal cordierite as the principal crystalline phase.

As a consequence of the good mechanical and electrical properties of cordierite, it is highly suitable as a substrate for electronic components, in particular for multilayer circuit boards. Since pure cordierite has very high sintering temperatures at which conductor circuitry applied before sintering would be destroyed, the starting point is a glass powder which can be sintered at relatively low temperatures and simultaneously substantially converted into a crystalline phase.

It is known that glass powders whose composition corresponds to stoichiometrically pure cordierite have only a limited sintering capability. Pressing and firing at temperatures of up to 1200° C. yield sintered glass ceramics which are porous and have low mechanical strengths. The poor sinterability is due to premature surface crystallization of the glass particles, which causes a dramatic increase in the viscosity of several orders of magnitude, which prevents further sintering of the glass phase. A further disadvantage is that MgO-containing high-quartz mixed crystal phases initially form. Representatives from this series of mixed crystals are $\mu$-cordierite having an $MgO:Al_2O_3:SiO_2$ oxide ratio of 2:2:5 and a magnesium aluminosilicate (MAS) having a ratio of 1:1:4. The existence of these metastable crystal phases additionally delays the formation of hexagonal cordierite.

Glass powders having a modified composition and improved sinterability have therefore already been disclosed. Thus, U.S. Pat. No. 3,926,648 states that the sinterability is improved by addition of 0.5-2% by weight of $K_2O$ and/or $Cs_2O$. However, the sintered elements produced from these glass powders have impaired electrical and dielectric properties and are therefore generally unsuitable for use for electrotechnical and electronic components, in particular if the requirements are stringent.

German Patent 26 02 429 provides a modification by adding 0.7-5.6 mol % of one or more of the modifying oxides BaO, PbO, SrO and CaO. These oxides are capable of forming mixed crystals in the cordierite structure. However, the low residual glass phase content limits the sinterability of the powder, so that the powders are principally used as coatings on ceramic, glass or glass-ceramic articles.

German Patent 29 01 172 describes two different sintered glass ceramics, firstly a glass ceramic based on $\beta$-spodumene as the most important crystalline phase, and secondly, a sintered glass ceramic based on cordierite as the most important crystalline phase. The structure of the latter sintered glass ceramic additionally contains clinoenstatite and in some cases $\mu$-cordierite in addition to hexagonal cordierite. This complex structure makes it necessary to observe narrow tolerances for all the process parameters, such as chemical composition, powder properties and sintering schedule, in order to achieve the formation of a uniform structure, and thus reproducible properties. These sintered glass ceramics, therefore, are produced by a complex process on the one hand and are difficult to match to the various processing conditions of various users on the other hand.

U.S. Pat. No. 4,540,671 describes a glass powder which can be sintered to yield a sintered glass ceramic containing cordierite and a high-quartz mixed crystal phase in solid solution. However, the occurrence of the metastable high-quartz mixed crystal phase results in the disadvantages mentioned above.

SUMMARY OF THE INVENTION

An object of the invention is to provide a glass powder which can be crystallized to yield a sintered glass ceramic containing hexagonal cordierite as the principal crystalline phase and which has such a composition that it sinters at temperatures of 970° C. and below, has good electrical and mechanical properties and allows the user considerable latitude with respect to heating rate, sintering temperature and sintering time in his choice of sintering conditions.

Other objects include a sintering process and sintered articles based on the glass powder.

Upon further study of the specification and appended claims, further objects and advantages of this invention will become apparent to those skilled in the art.

To attain these objects, there is provided a glass powder crystallizable to yield a sintered glass ceramic containing hexagonal cordierite as at least 50% by weight of resultant crystalline phase, said glass powder having a composition, in mol % on an oxide basis, consisting essentially of

| | |
|---|---|
| 48–61 $SiO_2$ | 0–1.5 BaO |
| 10–16 $Al_2O_3$ | 0–3 PbO |
| 23–35 MgO | 0–3 SrO |
| 0–4 $B_2O_3$ | 0–3 $SnO_2$ |
| 0–2.5 $P_2O_5$ | 0–3 $\Sigma$ PbO + SrO + $SnO_2$ |
| | 0–3 CaO |
| | 0–3 ZnO |
| 0.5–5 $\Sigma$ $B_2O_3$ + $P_2O_5$ | 0.5–12 F as a substitute for O. |

To obtain a dense sintered glass ceramic, i.e., without open pores, having a high crystal phase content, the course of sintering and crystallization is important. In contrast to a compact glass ceramic, which experiences volume nucleation in the interior as a consequence of added nucleating agents such as titanium dioxide or zirconium dioxide, the crystallization in the preparation of a sintered glass ceramic from glass powder proceeds from the original surfaces of the particles of the glass powder. The dense sintering must be completed while the article is substantially still in the glassy state. If premature surface crystallization occurs, the viscosity of the surface layer of the glass particles increases so much that further dense sintering is greatly hindered, if not interrupted. If, by contrast, the ability of the glass to crystallize is suppressed, for example, by adding relatively large amounts of modifying oxides, the desired homogeneous, finely crystalline structure having a high crystal phase content can no longer be produced. Instead, there are produced coarse-crystalline sintered glass ceramics of low strength which are unsuitable for most applications.

The $SiO_2$ content in the glass powder should be between 48 and 61 mol %. If the $SiO_2$ content drops below 48 mol %, sintering with adequate crystallization of the hexagonal cordierite phase is not possible below 970° C. If the $SiO_2$ content exceeds 61 mol %, metastable magnesium aluminosilicate crystals crystallize preferentially, with the disadvantages described above. The particularly preferred $SiO_2$ content is between 51 and 57 mol %.

The $Al_2O_3$ content is between 10 and 16 mol %. If the upper limit of 16 mol % is exceeded, the temperature necessary for production of a dense-sintered glass ceramic increases. Conversely, if the $Al_2O_3$ content drops below 10 mol %, the content of the desired hexagonal cordierite phase drops, and MgO- and $SiO_2$-containing crystal phases, which result in an increase in the dielectric constant, are formed to an increased extent. The preferred $Al_2O_3$ content is 12.5-15.5 mol %.

The MgO content should be between 23 and 35 mol %. If this range is exceeded, the content of hexagonal cordierite is reduced, whereas an MgO content below this range results in an impairment of the sintering properties of the glass powder. The preferred MgO content is 26-31 mol %.

In order to reduce the sintering temperature, the glass powder contains up to 4 mol % of $B_2O_3$ and up to 2.5 mol % of $P_2O_5$; the total content of these two compounds should be between 0.5 and 5 mol %. The upper limits of these ranges should not be exceeded since otherwise the residual glass phase becomes rife, which results in an impairment of the properties. However, the addition of $B_2O_3$ and/or $P_2O_5$ as a contribution toward reducing the sintering temperature should not be less than 0.5 mol % in total.

The addition of zinc oxide promotes crystallization of the hexagonal cordierite at low temperatures. However, the zinc oxide content should be not more than 3 mol % since otherwise there is a danger that sintering to form a dense body would become much more difficult as a consequence of premature surface crystallization. The preferred zinc oxide content is from 0.3 to 2.5 mol %. CaO contents likewise promotes crystallization at low temperatures, but contents above 3 mol % should be avoided since anorthite as an additional and undesired crystal phase occurs even at such low contents. The addition of BaO improves the homogeneity and stability in the glass melt, but a BaO content of 1.5 mol % should not be exceeded since at higher contents, crystallization of the glass powder is inhibited and shifted toward unacceptably high temperatures.

An essential element of the invention is a fluorine content of 0.5-12 mol %, preferably 0.5-11 mol %, the fluoride ion replacing a corresponding amount of oxygen ions in the crystal lattice. Surprisingly, it has been found that addition of fluorine allows the crystallization temperature of the glass powder to be shifted to lower temperatures of down to below 900° C. without adversely affecting the sintering operation. This behavior is in contrast to crystallization-promoting additives such as zinc oxide or barium oxide, in which a compromise must always be drawn between dense-sintering and low crystallization temperature. The addition of fluorine promotes crystallization of the hexagonal cordierite phases and suppresses the undesired precursor phases $\mu$-cordierite and magnesium aluminosilicate. The structure remains stable for sintering and crystallization over a broad temperature range. The fluorine content should not exceed 12 mol % since otherwise new fluorine-containing crystal phases may occur, adversely affecting the stability of the structure toward changes in sintering temperature. Furthermore, the homogeneity of the glass melt and the hydrolytic stability of the sintered glass ceramic are also impaired. Even the addition of small amounts of fluorine result in a significant reduction in the crystallization temperature while simultaneously reducing the sintering temperature or reducing the sintering times, but the fluorine content should not drop below 0.5 mol % since the effect of the addition of fluorine is not always satisfactory below this level.

As a further crystallization-promoting additive, PbO, SrO or $SnO_2$ can be added. The maximum amount of the individual oxide should not exceed 3 mol %. If more than one of these three oxides are used together, the total amount used should likewise be not greater than 3 mol %. The addition of larger amounts than 3 mol % results in premature crystallization, thus preventing good sintering. If PbO is used, it should additionally be noted that the lead oxide may be reduced to metallic lead at elevated sintering temperatures in a reducing sintering atmosphere, which can result in an unacceptable reduction in the electrical volume resistance.

In the production of the glass from which the glass powder is produced, conventional fining agents, such as, for example, $Sb_2O_3$, $As_2O_3$ or cerium compounds, in conventional concentrations of up to about 1% by weight can be added to the glass without adversely affecting its properties. However, they are not absolutely necessary.

The particles size of the sinterable glass powder plays an important part in the optimization of the sintering process and the resultant surface crystallization. In general, good results are achieved using glass powders having a mean particle size of between 1 and 12 $\mu$m. If the particle sizes are too small, the large surface/volume ratio causes the glass powder to tend toward premature surface crystallization, which prevents good sintering. Excessively large particle sizes on the other hand make later crystallization more difficult, since they result in a relatively coarse crystalline structure having impaired mechanical strength and yield sintered articles of increased surface roughness. Particularly favorable results are obtained if the mean particle size of the glass powder is between 1.5 and 7 $\mu$m.

The glass powders are prepared in a manner known per se by melting conventional glass raw materials at temperatures of about 1450°-1650° C. to yield a glass of the composition described, then quenching the molten glass by pouring into cold water or onto cooled metal rollers, yielding a glass cullet which is converted into powders having the described particle size by known fritting or grinding methods.

Fluorine, in particular, is introduced by utilizing a salt thereof as a glass raw material, for example, an alkali metal or alkaline earth metal fluoride or aluminum fluoride which is preferred.

The glass powder obtained in this way is then converted into a shaped article in a manner known per se, for example, using the forming methods, which are conventional in the ceramics industry, such as dry pressing, extrusion, injection molding, calendering, tape casting, etc. The conversion is carried out with addition of commercially available organic assistants and/or suitable suspending agents. Thus, for example, extrusion proceeds from a plasticized composition having plastic properties. Dry pressing is carried out by adding pressing assistants and working up to give free-flowing compressed granules. For the production of flexible green films, from which electronic substrates are later produced, tape casting from a ceramic slurry has proven successful. If suspending agents are added, a drying process is also necessary before sintering. Any organic assistants present are burnt out during the heating phase by means of suitable temperature control in the sintering program, before noticeable sintering of the glass takes place.

Sintering and crystallization of the glass powder take place at temperatures between about 850° and 970° C., depending on the composition of the glass powder. The sintering times depend on the sintering temperature used and are between about 15 minutes and several hours. Lower sintering temperatures require an extended sintering time. For a given glass composition, a particular structure can, if desired, be obtained at a desired lower sintering temperature and a larger sintering time, which structure would be similar to that which would have been obtained at a higher sintering temperature and a shorter sintering time. A pore-free sintered glass ceramic is accordingly produced by producing a glass having the composition described, comminuting this glass to a particle size of 1-12 μm, shaping the glass particles into the desired shape, heating the glass particles continuously to a temperature of up to 970° C. in a mold and holding this temperature until the particles have sintered together, devitrifying the glass, and subsequently cooling the sintered articles. Before the heating and sintering, the shaped articles or precursors thereof can be provided with patterns of electrical conductor circuitry, for example, by screen printing or the like.

Although the composition of the glass powder according to the invention differs from the stoichiometric composition of cordierite, high crystal phase contents having a hexagonal cordierite structure are nevertheless produced by mixed crystal formation (solid solution); crystal phases not comprising cordierite or the residual glass phase are kept relatively small. This formation of mixed crystal (solid solutions) furthermore allows the incorporation of super-stoichiometric amounts of MgO and $SiO_2$ at the expense of $Al_2O_3$ without impairing the crystallinity. Moreover, the sinterability of the glass powder is improved and the amount of required modifying oxides is reduced.

In quantitative terms, in percent by weight, based on the total weight of the sintered article, the content of the hexagonal cordierite phase is generally about 40 to 85%, preferably 50 to 75%. Moreover, of the crystalline content in the product, the cordierite phase generally amounts to at least about 50% by weight.

The sintered glass ceramics produced from the glass powder according to the invention are impermeable to air and therefore allow the encapsulation of sensitive electronic components. The low dielectric constant permits metallized electronic substrates manufactured therefrom to have only a slight delay in signal transmission times. The low sintering temperature of a maximum of 970° C. allows metallization with highly conductive metals, such as copper, silver, silver/palladium and gold, to be employed. The thermal expansion coefficient of the sintered glass ceramic can be matched to that of silicon, so that mechanical stresses between the substrate material and the silicon semiconductor wafer due to different thermal expansion coefficients are minimized. In addition to compact sintered glass ceramic substrates, multilayer wiring substrates with internal conductor circuitry can also be produced.

Sintered glass ceramic parts produced from the glass powder according to the invention are distinguished by low thermal conductivity, high heat resistance and good thermal shock behavior. The high electrical volume resistance and the high dielectric strength allow use for electrical insulation purposes. The glass powders are furthermore suitable for coating or for grouting between (soldering of) ceramics and are stable even at high temperatures.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, and of corresponding German application P 41 03 778.2, are hereby incorporated by reference.

EXAMPLES

The results of the examples are collated in Tables 1-4. Tables 1 to 3 show the chemical composition and Tables 2 to 4 the physical data of the examples wherein the crystalline phase contents are based on the total sintered product. Of the physical data, the mean particle size ($d_{50}$) was measured by means of a laser granulometer. The sintering was carried out at the temperatures indicated, a uniform heating rate of 3° C./min. being used. The following X-ray reflections were used for determining the crystal phase contents: 102 reflection for hexagonal cordierite; 011 reflection for MAS; 120 reflection for forsterite; 610 reflection for magnesium aluminosilicate (JCPDS 35-310). In some cases, the sintered glass ceramics still contained small amounts of enstatite modifications. Due to the large number of possible modifications and the low contents, it was necessary to carry out a qualitative estimate here. The determination of hexagonal cordierite (JCPDS File No. 13-293), μ-cordierite (JCPDS File No. 14-249) and forsterite (JCPDS File No. 34-189) was carried out against fully crystallized standards. The comparison standard for the MAS phase (JCPDS 27-716) also contained other crystal phases, so that the amount of data here are affected by somewhat greater error (on the order of about 20%).

The dielectric constant ε and the loss angle tan δ were measured at 25° C. and a frequency of 1 MHz. At higher frequencies in the Gigahertz range, the dielectric constant and the loss angle drop significantly. Differential thermoanalysis was employed to estimate the crystallization temperatures. Since this method requires a high heating rate (here 5° C./min.), the true crystallization temperature in standard sintering programs is systematically lower. However, it is possible to give an indication of the effect of chemical composition on the crystallization temperature. The table shows in each case the beginning of the crystallization peak and crystallization maximum. These values allow the crystallization temperatures of various sintered glass ceramics to be estimated relative to one another.

EXAMPLES 1-4

Examples 1-4 (Tables 1 and 2) show the effect of the fluorine content on the sintering temperature and the crystallization behavior for otherwise identical compositions. Example 1 is used for comparison. The glass powders having the compositions indicated in Table 1 were prepared by melting an appropriate glass batch at 1600° C. The melt was quenched between two water-cooled metal rollers and ground to the particle size indicated in Table 2. Free-flowing compressed granules were obtained from the glass powder by granulating the powder in a manner known per se in an intensive mixer with an aqueous solution of polyethylene glycol. Shaped articles for sintering experiments were produced by dry pressing under a pressure of 800 bar. The sintering time was 1 hour at the sintering temperature indicated, and the heating rate was 3° C./min. The temperature was held at 310° C. for 1 hour in order to remove polyethylene glycol from the sintered article.

Examples 2–4 show very clearly, in comparison to Example 1, the extraordinarily positive effect exerted by the fluorine content. It can be seen from Table 2 that fluorine shifts the crystallization temperature toward lower temperatures. The crystallization of hexagonal cordierite is promoted, and the other crystal phases are suppressed. The structure is stabilized, and the crystal phase content changes only a little in a broad temperature range; thus, the content of hexagonal cordierite in Example 3 is virtually constant at sintering temperatures between 910° and 970° C. The stabilization of the structure by means of the fluorine content also means that the thermal expansion coefficient for the compositions according to the invention changes only little at sintering temperatures between 910° and 970° C. Example 1, carried out for comparison without fluorine, shows, by contrast, greatly varying crystal phase contents and a varying thermal expansion coefficient. All the sintered articles according to the invention are sintered at the sintering temperatures indicated so as to be impermeable to air.

EXAMPLES 5–13

Examples 5–13, using further glass powder compositions according to the invention, are summarized in Tables 3 and 4. Examples 11–13 show the effect of the crystallization-promoting additives SrO, PbO and $SnO_2$.

EXAMPLE 14

Flexible green films having a thickness of 200 μm were produced by the process below from the glass powder of Example 8. Organic assistants and an organic solvent mixture were added to the glass powder in a ball mill, and the mixture was homogenized giving a pourable slurry. The batch comprised 53% by weight of glass powder, 37% by weight of an azeotropic solvent mixture of trichloroethylene and ethanol, 5% by weight of polyvinylbutyral as binder, 4% by weight of dioctyl phthalate as plasticizer and 1% by weight of menhaden fish oil as thinner. The slurry was degassed and poured onto a moving continuous belt. The casting shoe and the belt are separated by a narrow adjustable gap via which the thickness of the films is regulated. After passing through a drying zone, the flexible film can be removed from the casting belt.

Several layers of these green films were stacked one on top of the other and pressed in a laminating press at a pressure of 0.5–3 $kN/cm^2$ at a temperature of 90° C. to yield a uniform composite. The laminates obtained in this way were sintered on a flat firing support at a temperature of 930° C. for a sintering time of 1 hour. Due to the relatively high contents of organic assistants, a heating rate of 2° C./min. was generally used. In the region of the burn out temperature of the organic assistants, i.e., in the temperature range from 220° C. to 330° C., the heating rate was reduced to 1° C./min. The laminates were then treated at 330° C. for two hours in order to complete the removal of the organic assistants. Heating was then continued at 2° C./min. until the desired sintering temperature was reached. The structure and properties of the sintered glass ceramic substrate obtained in this way agree with the values also obtained on sintering compacts using the same temperature program.

In all examples, the specific electrical volume resistance at room temperature was greater than $10^{13}$·Ω-cm, i.e., the material was a very good electrical insulator.

TABLE 1

| | Glass Powder Compositions (mol %) | | | | | F |
|---|---|---|---|---|---|---|
| Example | $SiO_2$ | $Al_2O_3$ | MgO | $P_2O_5$ | $B_2O_3$ | (as substitute for O) |
| 1 | 54.0 | 15.1 | 28.4 | 2.0 | 0.5 | 0 |
| 2 | 54.0 | 15.1 | 28.4 | 2.0 | 0.5 | 4.0 |
| 3 | 54.0 | 15.1 | 28.4 | 2.0 | 0.5 | 6.6 |
| 4 | 54.0 | 15.1 | 28.4 | 2.0 | 0.5 | 10.6 |

TABLE 2

| | Crystal Phase Contents and Material Properties of the Sintered Glass Ceramics Obtained | | | | | | | | | | | |
|---|---|---|---|---|---|---|---|---|---|---|---|---|
| | Mean Powder | Sintering Temperature (sintering time 1 h) | Crystal Phase Contents (% by weight) | | | | | Dielectric Properties (1 MHz, 25° C.) | | Thermal Expansion Coefficient | DTA | |
| | | | | | | | | | | | Beginning | Peak |
| Example | Particle $d_{50}$ (μm) | $T_S$ (°C.) | μ | MAS | hex. cord. | Mg/Al silicate | Forsterite | Others | E | tan δ ($10^{-4}$) | α ($10^{-6}$/K) ($20-300°$ C.) | of Peak (°C.) | Maximum (°C.) |
| 1 | 2.8 | 890 | — | 59 | <10 | — | — | — | — | — | — | 915 | 994 |
|  | 2.8 | 910 | — | 54 | 22 | 2 | 10 | — | — | — | 3.33 | | |
|  | 2.8 | 930 | — | 38 | 39 | 2 | 10 | — | — | — | — | | |
|  | 2.8 | 950 | — | 16 | 53 | 2 | 10 | — | — | — | — | | |
|  | 2.8 | 970 | — | 10 | 57 | 2 | 10 | — | 5.2 | 16 | 2.25 | | |
| 2 | 2.4 | 890 | — | 45 | 46 | — | 8 | — | — | — | — | 905 | 950 |
|  | 2.4 | 910 | — | 24 | 55 | — | 5 | — | — | — | 1.82 | | |
|  | 2.4 | 930 | — | 5 | 68 | — | <5 | — | — | — | — | | |
|  | 2.4 | 950 | — | <5 | 70 | — | — | — | — | — | — | | |
|  | 2.4 | 970 | — | <5 | 76 | — | — | — | 5.1 | 16 | 1.86 | | |
| 3 | 2.4 | 890 | — | 18 | 61 | — | — | — | — | — | — | 885 | 922 |
|  | 2.4 | 910 | — | 5 | 70 | — | — | — | — | — | 1.84 | | |
|  | 2.4 | 930 | — | 5 | 71 | — | — | — | — | — | — | | |
|  | 2.4 | 950 | — | <5 | 71 | — | — | — | — | — | — | | |
|  | 2.4 | 970 | — | <5 | 75 | — | — | — | 5.1 | 19 | 2.01 | | |
| 4 | 2.3 | 890 | — | 31 | 45 | — | — | — | — | — | — | 860 | 897 |

TABLE 2-continued

Crystal Phase Contents and Material Properties of the Sintered Glass Ceramics Obtained

| Example | Mean Powder Particle d50 (μm) | Sintering Temperature (sintering time 1 h) $T_S$ (°C.) | Crystal Phase Contents (% by weight) | | | | | Dielectric Properties (1 MHz, 25° C.) | | Thermal Expansion Coefficient (20-300° C.) $\alpha$ $(10^{-6}/K)$ | DTA | |
|---|---|---|---|---|---|---|---|---|---|---|---|---|
| | | | μ | MAS | hex. cord. | Mg/Al silicate | Forsterite | Others | E | tan δ $(10^{-4})$ | | Beginning of Peak (°C.) | Peak Maximum (°C.) |
| | 2.3 | 910 | — | 17 | 53 | — | — | — | — | — | 2.89 | | |
| | 2.3 | 930 | — | 11 | 58 | — | — | — | — | — | — | | |
| | 2.3 | 950 | — | 5 | 70 | — | — | — | — | — | — | | |
| | 2.3 | 970 | — | <5 | 71 | — | — | — | 5.1 | 28 | 2.74 | | |

TABLE 3

Glass Powder Compositions (mol %)

| Example | $SiO_2$ | $Al_2O_3$ | MgO | $P_2O_5$ | $B_2O_3$ | ZnO | CaO | BaO | SrO | $SnO_2$ | PbO | F (as substitute for O) |
|---|---|---|---|---|---|---|---|---|---|---|---|---|
| 5 | 53.5 | 13.8 | 29.0 | 1.0 | 1.2 | 1.5 | — | — | — | — | — | 4.8 |
| 6 | 52.7 | 13.6 | 28.6 | 1.2 | 0.9 | 1.5 | 1.5 | — | — | — | — | 3.0 |
| 7 | 52.7 | 13.6 | 28.6 | 0.6 | 1.5 | 1.5 | 1.5 | — | — | — | — | 3.0 |
| 8 | 52.7 | 13.6 | 28.6 | 1.2 | 0.9 | 1.2 | 1.5 | 0.3 | — | — | — | 2.9 |
| 9 | 55.0 | 13.0 | 28.5 | 1.1 | 0.9 | — | 1.5 | — | — | — | — | 0.7 |
| 10 | 55.0 | 13.0 | 28.5 | 1.1 | 0.9 | 1.5 | — | — | — | — | — | 0.9 |
| 11 | 55.0 | 13.0 | 28.5 | 1.1 | 0.9 | — | — | 1.5 | — | — | — | 0.9 |
| 12 | 55.0 | 13.0 | 28.5 | 1.1 | 0.9 | — | — | — | — | — | 1.5 | 0.7 |
| 13 | 55.0 | 13.0 | 28.5 | 1.1 | 0.9 | — | — | — | — | 1.5 | — | 0.8 |

TABLE 4

Crystal Phase Contents and Material Properties of the Sintered Glass Ceramics Obtained

| Example | Mean Powder Particle d50 (μm) | Sintering Temperature (sintering time 1 h) $T_S$ (°C.) | Crystal Phase Contents (% by weight) | | | | | Dielectric Properties (1 MHz, 25° C.) | | Thermal Expansion Coefficient (20-300° C.) $\alpha$ $(10^{-6}/K)$ | DTA | |
|---|---|---|---|---|---|---|---|---|---|---|---|---|
| | | | μ | MAS | hex. cord. | Mg/Al silicate | Forsterite | Others | E | tan δ $(10^{-4})$ | | Beginning of Peak (°C.) | Peak Maximum (°C.) |
| 5 | 3.1 | 910 | — | <1 | 76 | <1 | 1 | — | — | — | 2.13 | 890 | 925 |
|   | 3.1 | 930 | — | — | 78 | 1 | 1 | a) | — | — | — | | |
|   | 3.1 | 970 | — | — | 81 | 2 | — | a) | 5.4 | 17 | 2.25 | | |
| 6 | 3.5 | 910 | — | 2 | 63 | — | 8 | — | — | — | — | 930 | 973 |
|   | 3.5 | 930 | — | — | 63 | — | 7 | — | — | — | — | | |
|   | 3.5 | 970 | — | — | 70 | — | 3 | — | 5.4 | 38 | 3.0 | | |
| 7 | 3.8 | 910 | — | — | 58 | — | 3 | a) | — | — | — | 920 | 975 |
|   | 3.8 | 930 | — | — | 58 | — | 3 | a) | — | — | — | | |
|   | 3.8 | 970 | — | — | 64 | — | — | a) | 5.4 | 26 | 2.80 | | |
| 8 | 3.1 | 910 | — | — | 60 | — | 6 | a) | — | — | — | 920 | 944 |
|   | 3.1 | 930 | — | — | 68 | — | 5 | a) | — | — | — | | |
|   | 3.1 | 970 | — | — | 72 | — | 2 | a) | 5.3 | 28 | 2.56 | | |
| 9 | 3.3 | 930 | — | — | 59 | 2 | <5 | b) | — | — | — | 930 | 900 |
|   | 3.3 | 970 | — | — | 77 | 2 | — | b) | 5.2 | 22 | 2.97 | | |
| 10 | 3.3 | 930 | — | — | 67 | 2 | <5 | — | — | — | — | 923 | 962 |
|   | 3.3 | 970 | — | — | 74 | 2 | <5 | — | 5.3 | 15 | 2.19 | | |
| 11 | 3.2 | 930 | — | 15 | 44 | 3 | <5 | c) | — | — | — | 955 | 1013 |
|   | 3.2 | 970 | — | 6 | 55 | 5 | <5 | c) | 5.5 | 14 | 3.55 | | |
| 12 | 3.1 | 930 | — | — | 67 | 2 | <5 | — | — | — | — | 935 | 973 |
|   | 3.1 | 970 | — | — | 71 | 2 | <5 | — | 5.5 | 24 | 2.71 | | |
| 13 | 3.3 | 930 | — | 22 | 42 | — | 10 | — | — | — | — | 925 | 975 |
|   | 3.3 | 970 | — | 15 | 48 | — | 9 | — | 5.3 | — | 2.48 | | | a) = very little enstatite
b) = very little anorthite
c) = very little high sanidine The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Glass powder crystallizable to yield a sintered glass ceramic containing hexagonal cordierite as at least 50% by weight of resultant crystalline phase, said glass powder having a composition, in mol % on an oxide basis, consisting essentially of

| 48-61 | $SiO_2$ | 0-1.5 | BaO | 0-3 | ZnO |
| 10-16 | $Al_2O_3$ | 0-3 | PbO | 0-3 | CaO |
| 23-35 | MgO | 0-3 | SrO | | |

-continued

| | | | |
|---|---|---|---|
| 0–4 | $B_2O_3$ | 0–3 | $SnO_2$ |
| 0–2.5 | $P_2O_5$ | 0–3 | $\Sigma$ PbO + SrO + $SnO_2$ |
| 0.5–5 | $\Sigma B_2O_3 + P_2O_5$ | 0.5–12 | F as a substitute for O. |

2. Glass powder according to claim 1, consisting essentially of

| | | | |
|---|---|---|---|
| 51–57 | $SiO_2$ | 0–3 | PbO |
| 12.5–15.5 | $Al_2O_3$ | 0–3 | SrO |
| 26–31 | MgO | 0–3 | $SnO_2$ |
| 0.5–2.5 | $P_2O_5$ | 0–3 | $\Sigma$ PbO + SrO + $SnO_2$ |
| 0.3–2.0 | $B_2O_3$ | | |
| 1.0–3.0 | $\Sigma P_2O_5 + B_2O_3$ | | |
| 0.3–2.5 | ZnO | | |
| 0.5–11.0 | F as a substitute for O. | | |

3. Glass powder according to claim 1, said powder having a mean particle size of from 1 to 12 μm.

4. Glass powder according to claim 2, said powder having a mean particle size of from 1 to 12 μm.

5. Glass powder according to claim 2, having a particle size of 1.5–7 μm.

6. A method of producing a sintered glass ceramic containing hexagonal cordierite as at least 50% by weight of resultant crystalline phase, comprising sintering a shaped article of glass powder having a composition, in mol % on an oxide basis, consisting essentially of

| | | | |
|---|---|---|---|
| 48–61 | $SiO_2$ | 0–1.5 BaO | 0–3 ZnO |
| 10–16 | $Al_2O_3$ | 0–3 PbO | 0–3 CaO |
| 23–35 | MgO | 0–3 SrO | |
| 0–4 | $B_2O_3$ | 0–3 $SnO_2$ | |
| 0–2.5 | $P_2O_5$ | 0–3 $\Sigma$ PbO + SrO + $SnO_2$ | |
| 0.5–5 | $\Sigma B_2O_3 + P_2O_5$ | 0.5–12 F as a substitute for O. | |

7. A method according to claim 6, said glass powder consisting essentially of

| | | | |
|---|---|---|---|
| 51–57 | $SiO_2$ | 0–3 | PbO |
| 12.5–15.5 | $Al_2O_3$ | 0–3 | SrO |
| 26–31 | MgO | 0–3 | $SnO_2$ |
| 0.5–2.5 | $P_2O_5$ | 0–3 | $\Sigma$ PbO + SrO + $SnO_2$ |
| 0.3–2.0 | $B_2O_3$ | | |
| 1.0–3.0 | $\Sigma P_2O_5 + B_2O_3$ | | |
| 0.3–2.5 | ZnO | | |
| 0.5–11.0 | F as a substitute for O. | | |

8. A method according to claim 6, said glass powder having a mean particle size of from 1 to 12 μm.

9. A method according to claim 7, said glass powder having a mean particle size of from 1 to 12 μm.

10. A sintered article produced in accordance with claim 6.

11. A sintered article produced in accordance with claim 7.

12. A sintered article produced in accordance with claim 8.

13. A sintered article produced in accordance with claim 9.

* * * * *